Arthur O'Leary's Improved Water Meter.

No. 119,714.  Patented Oct. 10, 1871.

Witnesses

Inventor
Arthur O'Leary

UNITED STATES PATENT OFFICE.

ARTHUR O'LEARY, OF IOWA CITY, IOWA.

IMPROVEMENT IN WATER-METERS.

Specification forming part of Letters Patent No. 119,714, dated October 10, 1871.

*To all whom it may concern:*

Be it known that I, ARTHUR O'LEARY, of Iowa City, county of Johnson, and State of Iowa, have invented certain Improvements in Water-Meters, of which the following is a specification:

The object of my invention has been to measure water and other fluids by a mechanical device or machine in which the motive power for operating the machine would be derived from the force and pressure of the fluid to be measured when in motion, and the quantity of fluid utilized or consumed computed from the rotations of the machine; the nature of which consists of a self-sustaining case provided with induction and eduction-pipes, said case encompassing a wheel on whose periphery are hinged valves, which, with the inner surface of the case and the outer surface of the wheel, form buckets which receive the water from the induction-pipe and discharge the same through the eduction-pipe; the motion of said valves as the wheel rotates being made positive by the action of arms (connected with the valves) on cams formed on the standards which support the axis of the rotating wheel, as I will further explain by reference to the accompanying drawing, in which—

Figure 1:
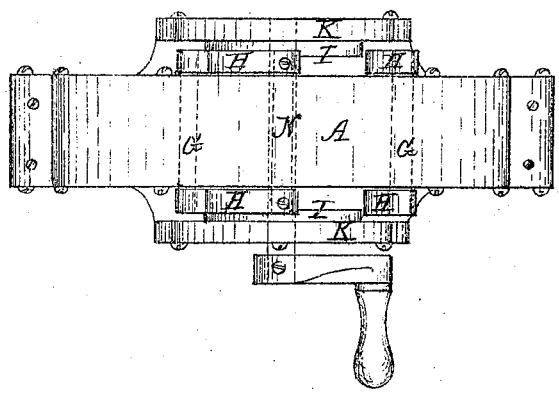
Figure 2:
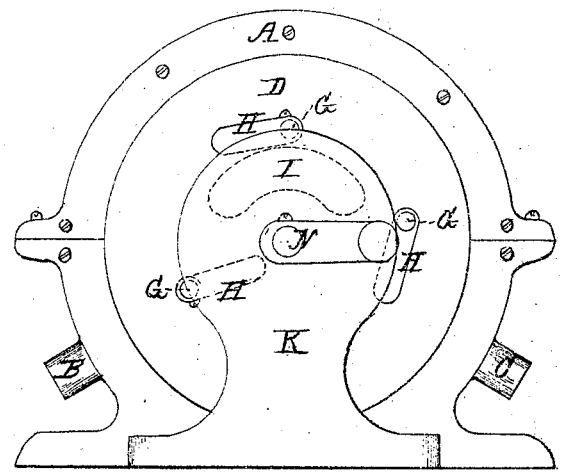
Figure 3:
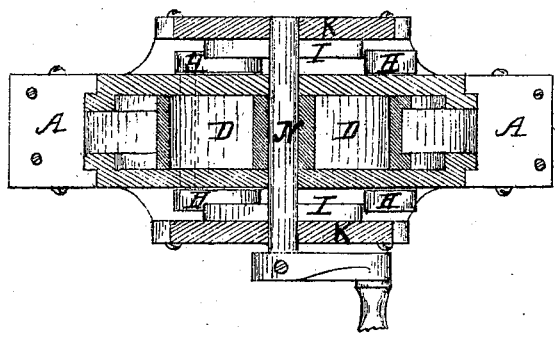
Figure 4:
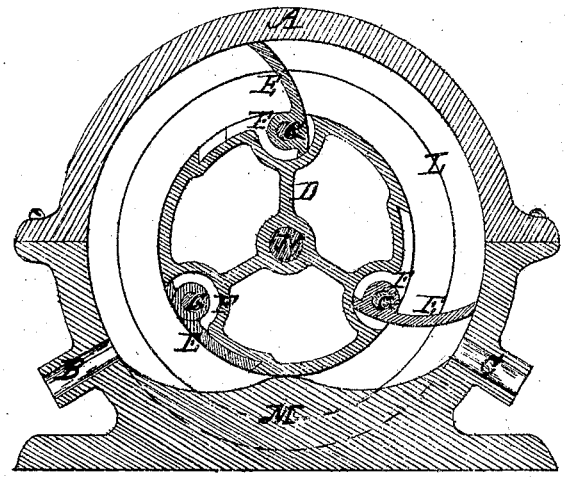
Figure 5:
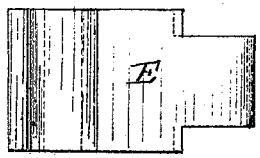
Figure 6:
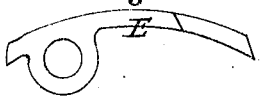

Figure 1 is a top view of the water-meter; Fig. 2, a side elevation, showing cams; Fig. 3, a horizontal section; and Fig. 4, a vertical section of same. Figs. 5 and 6 are views of one of the valves removed from the water-meter.

In the said drawing, A indicates the self-sustaining case; B, the induction, and C the discharge pipes. This case A encompasses the rotary wheel D, said wheel having valves E E, &c., hinged at F to its periphery. (See Fig. 4.) These valves swing on shafts G attached to the wheel; said shafts extending outside the wheel carry pitmen H, which, as the wheel rotates, are brought in contact with cams I on the standards K, by means of which arrangement the valves are opened at the proper time so as to form a bucket with the outer surface of the wheel and the inner surface of the case, (as shown at L, Fig. 4,) to receive the influx of the water from the induction-pipe, and, being carried beyond the discharge-pipe C, are again closed at the proper time by coming in contact with a bridge, M, stationed in the bottom of the case. (See Fig. 4.) N is the axis or shaft of the rotary wheel, and to which an instrument may be attached for recording the number of gallons of water passed through the water-meter.

What I claim is—

The case A, pipes B and C, rotating wheel D, valves E, pitmen H, and cams I, all arranged and operating substantially as and for the purposes set forth and described.

In testimony whereof I have hereunto set my signature this 7th day of August, 1871.

ARTHUR O'LEARY, M. D.

Witnesses:
IRA J. ALDEN,
G. W. DODDEE.

(39)